United States Patent
Bravo

Patent Number: 5,887,487
Date of Patent: Mar. 30, 1999

[54] FASTENING DEVICE FOR AN ACTUATING CABLE

[75] Inventor: Ernesto Bravo, Cambiano, Italy

[73] Assignee: Dr. Ing.h.c.F. Porsche AG, Weissach, Germany

[21] Appl. No.: 829,174

[22] Filed: Mar. 31, 1997

[30] Foreign Application Priority Data

Mar. 29, 1996 [IT] Italy ................................ TO96 A 0245

[51] Int. Cl.⁶ ....................................................... F16C 1/16
[52] U.S. Cl. ............................................. 74/502.4; 248/56
[58] Field of Search ............................... 74/502.4, 502.6, 74/501.5 R; 403/321; 248/56, 27.3; 285/243

[56] References Cited

U.S. PATENT DOCUMENTS

| | | | |
|---|---|---|---|
| 2,474,172 | 6/1949 | Tinnerman | 248/56 X |
| 4,951,524 | 8/1990 | Niskanen | 74/502.6 X |
| 5,347,882 | 9/1994 | Klotz . | |
| 5,553,818 | 9/1996 | Wild | 74/502.4 X |
| 5,596,908 | 1/1997 | Hall | 74/502.4 |

FOREIGN PATENT DOCUMENTS

| | | |
|---|---|---|
| 0239984A2 | 10/1987 | European Pat. Off. . |
| 0365243A1 | 4/1990 | European Pat. Off. . |
| 93 13 485.1 | 12/1993 | Germany . |

OTHER PUBLICATIONS

Search Report Mar. 18, 1998 Europe.
V. Obering, M. Klein: "Einführung in die DIN–Normen", 1970, B.G. Teubner, Stuttgart XPOO2O56587, pp. 552–554.

*Primary Examiner*—Charles A. Marmor
*Assistant Examiner*—Mary Ann Battista
*Attorney, Agent, or Firm*—Evenson McKeown Edwards & Lenahan, PLLC

[57] ABSTRACT

A fastening device secures an actuating cable in a U-shaped opening in a holder into which the fastening device can be inserted radially, wherein the arms of the opening and the attachment part comprise catch members for fixing the attachment part radially, the catch members engaging one behind the other in the inserted state. In order to be able to detach the fastening device again, the catch members are formed in such a way that they project beyond the holder in the axial direction. The projections formed in this way can then be gripped and the locking can be released by pressing the projections together. In order to improve the manipulation both during assembly and during dismantling, it is proposed to design the handle on the catch member in such a way that one respective lug is formed integrally on each of the catch members.

11 Claims, 1 Drawing Sheet

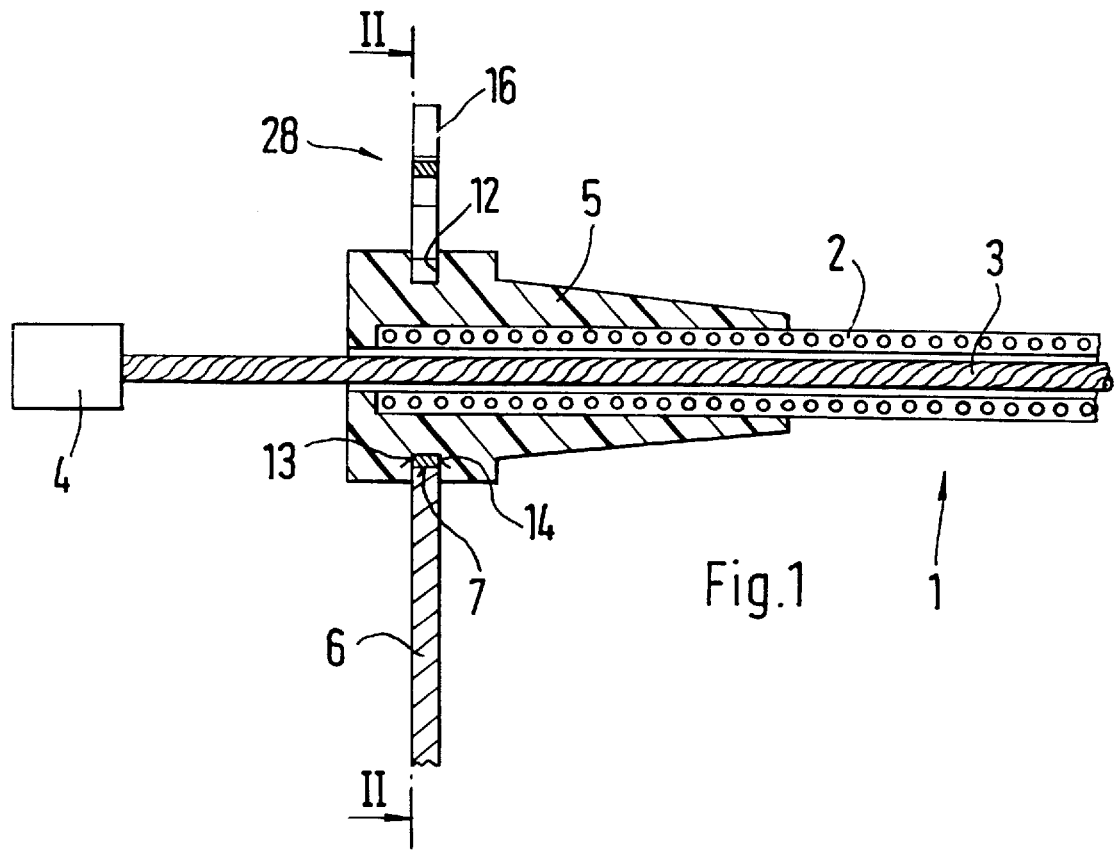
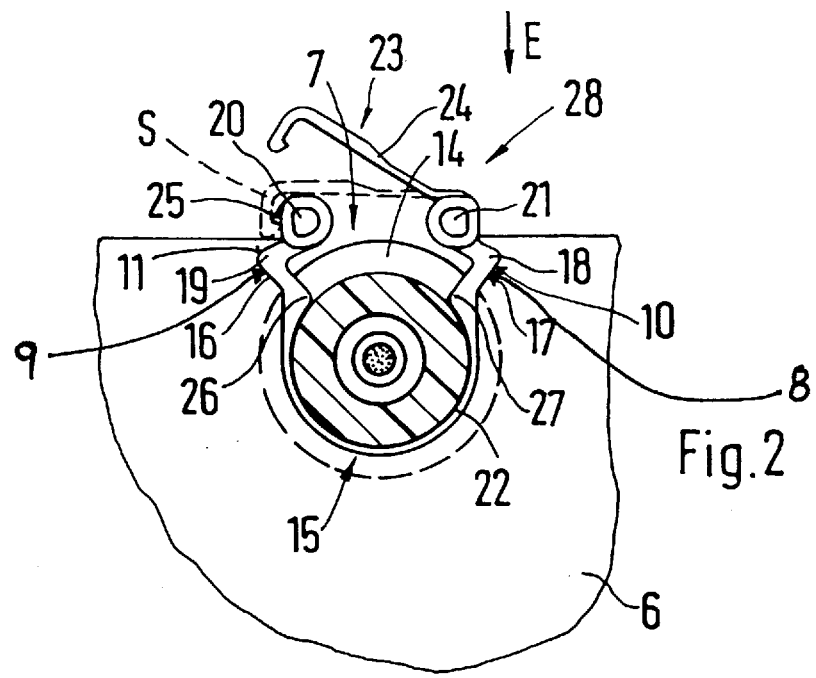

FASTENING DEVICE FOR AN ACTUATING CABLE

BACKGROUND AND SUMMARY OF THE INVENTION

This application claims the priority of Italian application TO 96 A 000245 filed Mar. 29, 1996 in Italy.

The invention relates to a fastening device for an actuating cable assembly of the type having an actuating covering and actuating core.

Actuating cables of this type comprise an actuating covering and a core movable axially therein. Actuation is performed by a movement of the core relative to the actuating covering in the form of a relative movement. It is therefore necessary to secure both the core and the actuating covering by a respective fastening device in both the axial and the radial directions.

A fastening device of this type is already known from German Patent Document DE-GM 93 13 485 U1. The fastening device comprises a U-shaped opening in a holding means into which the fastening device can be inserted radially, in which case the arms of the opening and the attachment part comprise catch members for fixing the attachment part radially, the catch members engaging one behind the other in the inserted state. A stop on both sides is formed for example by a groove, in the base of which the catch members are situated. This fastening device allows radial insertion of the holding means, in which case the catch members snap into each other when the end position is reached. In order to be able to detach the fastening device again, the catch members are formed in such a way that they project beyond the holding means in the axial direction. The projections formed in this way can then be gripped and the locking can be released by pressing the projections together.

In contrast, an object of the invention is to provide a fastening device for an actuating cable in which the manipulation is improved both during assembly and during dismantling.

According to the present invention it is proposed to design the handle on the catching members in such a way that one respective lug is formed integrally on each of the catching members. In this way it is advantageously possible to grip the catching members securely and also to be able to grip and manipulate the catching members securely under difficult fitting conditions, so that in this case too a trouble-free insertion and removal of the actuating cable is possible. In this connection it is particularly advantageous that customary tools, as known for example for assembling and dismantling circlips for shafts, can be used for this purpose.

Advantageous further features are provided in preferred embodiments of the invention. It is thus proposed that the catching members should not be integrally formed directly on the actuating cable, but should be formed as part of a separate securing device. This securing device can be pre-assembled on the fastening device, so as to facilitate assembly. Should the catch member be damaged during the fitting or removal of the actuating cable, the fastening device can be restored simply by replacing the securing device, and the actuating cable need not be replaced. At the same time, it also becomes unnecessary to assemble and position the actuating cable once again.

If, as proposed in a further embodiment, the securing member is additionally designed in such a way that the attachment part is rotatable about the longitudinal axis thereof with respect to the securing member, the assembly is further simplified, since twisting in the actuating cable can now be eliminated during assembly. At the same time, torsional forces are prevented from building up, so as to prolong the life of the actuating cable as a whole, which is designed primarily for stressing with longitudinal forces but not for stressing with torsional forces.

The proposed locking device makes it possible for the securing device to be pre-assembled in such a way as to prevent its loss. If the locking device is further formed by hookshaped members which engage over the catch members, the locking device does not need to be opened separately for assembling the securing device and with it also the fastening device.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional through an actuator cable assembly with a fastening device constructed according to a preferred embodiment of the invention; and FIG. 2 is a section along the line II—II in FIG. 1.

DETAILED DESCRIPTION OF THE DRAWINGS

The actuating cable 1 illustrated in FIG. 1 comprises an actuating covering 2 and a core 3 movable axially inside the actuating covering. At the end of the actuating cable 1 a nipple 4 is arranged as a fastening device for the core 3 and a socket 5 is arranged as part of a fastening device 28 for the actuating covering 2.

The nipple 4 is held (in a manner not shown) on an actuating device, such as for example a coupling or a selector lever, which is actuated by movement relative to a holder 6. In order to produce this relative movement, the socket 5 of the actuating covering 2 is secured to the holder 6. A U-shaped opening 7 is provided in the holder 6 for this purpose. The opening 7 has two branches 8, 9 which are each provided with a respective recess 10, 11.

In order to form the fastening device 28 a groove 12 is provided in the socket 5, the edges 13, 14 of the groove 12 projecting beyond the opening 7 and thus forming stops for the socket 5 on the holder 6, so that the socket 5 and with it the actuating covering 2 are secured in the axial direction.

Part of the fastening device 28 is likewise formed by a securing device 15, which is inserted into the groove 12 and is made substantially U-shaped and which in the opening 7 substantially fills the space between the holder means 6 and the base of the groove 12. A gap is left only between arms 16, 17 of the securing device 15, the width of said gap being smaller than the diameter of the socket 5 in the base of the groove 12. The arms 16, 17 substantially adjoin the branches 8, 9 of the opening 7 and are provided with projections 18, 19 which correspond to the recesses 10, 11 in the branches 8, 9 of the opening 7 when the securing device 15 has reached the specified position thereof in the opening 7.

Since the material used for the securing device 15, in this case plastics material, has resilient properties, it is possible to deform the arms 16, 17 by pressing them together to such a degree that the projections 18, 19 become disengaged from the corresponding recesses 10, 11 and the securing device 15 can be withdrawn from the opening 7 or inserted into the opening 7 in the direction E radially to the longitudinal extension of the actuating cable 1.

In order to allow the arms 16, 17 to be pressed together in this way, the ends of the arms 16, 17 are provided with molded on lugs 20, 21, forming openings into which a suitable tool can engage. The securing device 15 and with it also the socket 5 and the actuating covering 2 are temporarily connected to the tool by the positively locking connection produced in this case between the tool (not shown here) and the lugs 20, 21, and they can be moved with the aid of the tool. This makes it possible to receive the socket 5 with the securing device 15 inserted and to insert it securely into the opening 7 of the holder 6 with the aid of the tool even at fitting points having difficult access with only a tight fitting space. The same applies in a reverse manner to the removal of the socket 5 from the opening 7.

Since the base of the groove 12 is circular and the securing device 15 is provided on an abutment face 22 with a corresponding segment-shaped counter contour, the socket 5 and with it the actuating covering 2 are rotatably movable with respect to the securing device 15 and with it the holder 6. This ensures that no distortions can occur in the actuating covering 2 as a result of twisting. At the same time this facilitates the assembly of the actuating cable 1, upon which no forces need be exerted by way of the securing device 15 during the insertion of the socket 5 into the opening 7 in order to eliminate such a twisting of the actuating covering 2.

In addition, a locking device 23 is provided so as to be able to pre-assemble the securing device 15 on the fastening device 28. The locking device 23 comprises a hook 24 which is held pivotably on the first arm 18 of the securing device 15. The hook 24 is constructed in such a way that it can engage over the second arm 19 of the securing device 15. A projection 25, with which the front part of the hook 24 can engage, is provided on the second arm 19 at the point at which the hook 24 engages over the second arm 19.

In the illustration according to FIG. 2, the locking device is in its rest position. In the secured position S of the locking device 23, which is indicated in broken lines in FIG. 2, the hook 24 engages over the second arm 19 and is locked there by the projection 25. As a result, the arms 18, 19 of the securing member 15 are prevented from spreading apart, and projections 26, 27 provided on the inside of the arms 18, 19 rest against the abutment face 22. In this way, as also in the fitted position of the fastening device 28, radial movement is prevented between the securing device 15 and the socket opening 5 in the a direction E, and the securing device 15 is held in the groove 12 in such a way as to prevent its loss. Since the locking device 23 prevents the arms 18, 19 only from being spread apart, but not from being pressed together, it is possible, on the other hand, for the securing device 15 and with it the fastening device 28 to be assembled without the locking device 23 having to be released beforehand.

The fastening device 28 was illustrated above by way of the example of fastening the socket 5 of the actuating covering 2. It is to be understood, however, that the fastening device 28 illustrated is also suitable in the same way for securing the nipple 4 of the core 3. It is also possible, of course, to apply the fastening device illustrated to the nipple 4 and to the core 3 simultaneously.

Although the application of the locking device 23 was illustrated above with reference to the illustrated embodiment of the fastening device 28, it is perfectly possible for the locking device 23 illustrated also to be used in other fastening devices of the type defined in the introduction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An actuating cable assembly comprising:
   a holder with a U-shaped opening,
   a cable core surrounded by a socket,
   a securing device operable to accommodate selective securing of the core to the holder, and
   a locking member operable to lock the securing device,
   wherein said U-shaped opening in the holder includes a groove with axially facing portions and the securing device is formed with resilient arms insertable in said groove, said arms being engageable with respective parts of the socket and the holder to axially lock the same together when in an assembled condition,
   wherein handles are provided on the arms to accommodate assembly and disassembly of the securing device, and
   wherein the locking member is selectively engageable over the arms to prevent them from being spread apart when in a locked position of the locking member.

2. An assembly according to claim 1, wherein said locking member is pivotably connected to one of said arms.

3. An assembly according to claim 1, wherein ends of said arms include lugs having openings for accommodating gripping and manipulation of said arms by tools, whereby attachment and detachment of said cable core and holder is facilitated.

4. A fastening assembly for detachably attaching a cable core to a holder, comprising:
   a U-shaped opening in the holder which includes a holder groove with axially facing holder groove portions,
   a socket which in use surrounds and supports the cable core, said socket including a socket groove with axially facing socket groove portions which interengage with holder groove portions to axially hold the socket in position in the holder when the socket is inserted into said U-shaped opening to an in use position, and
   a securing device formed separately of said socket and connected with the socket,
   wherein said securing device includes a pair of resilient arms with respective protrusions engageable in respective recesses at the U-shaped opening of the holder to thereby selectively radially secure the socket in the holder, and
   wherein ends of said resilient arms are provided with lugs having openings accommodating gripping and manipulation of said arms by tools, whereby attachment and detachment of said cable core and holder is facilitated.

5. A fastening assembly according to claim 4, wherein the socket and the securing device are configured to permit relative rotation of the socket in the holder when in a fastened position with said core axially fixed in the holder.

6. A fastening assembly according to claim 4, wherein a locking device is provided for selectively locking said resilient arms in a predetermined position to thereby fasten the securing device and socket together as a preassembly.

7. A fastening assembly according to claim 6, wherein said locking device includes a member selectively engageable over ends of the arms to prevent them from being spread apart.

8. A fastening assembly according to claim 6, wherein the locking device comprises a hook held pivotably on a first arm of said arms and engaged in the locking position over a second of the arms and locking on said second arm.

9. A fastening assembly for detachably attaching a cable core to a holder, comprising:
- a U-shaped opening in the holder which includes a holder groove with axially facing holder groove portions,
- a socket which in use surrounds and supports the cable core, said socket including a socket groove with axially facing socket groove portions which interengage with holder groove portions to axially hold the socket in position in the holder when the socket is inserted into said U-shaped opening to an in use position, and
- a securing device formed separately of said socket and connected with the socket,
- wherein said securing device includes a pair of resilient arms with respective protrusions engageable in respective recesses at the U-shaped opening of the holder to thereby selectively radially secure the socket in the holder, and
- wherein a locking device is provided for selectively locking said resilient arms in a predetermined position to thereby fasten the securing device and socket together as a preassembly.

10. A fastening assembly according to claim 9, wherein said locking device includes a member selectively engageable over ends of the arms to prevent them from being spread apart.

11. A fastening assembly according to claim 9, wherein the locking device comprises a hook held pivotably on a first arm of said arms and engaged in the locking position over a second of the arms and locking on said second arm.

* * * * *